(12) United States Patent
Zhou et al.

(10) Patent No.: US 9,818,196 B2
(45) Date of Patent: Nov. 14, 2017

(54) METHOD AND DEVICE FOR POSITIONING AND NAVIGATING

(71) Applicant: Xiaomi Inc., Beijing (CN)

(72) Inventors: Peng Zhou, Beijing (CN); Yanbin Yuan, Beijing (CN)

(73) Assignee: Xiaomi Inc., Beijing (CN)

( * ) Notice: Subject to any disclaimer, the term of this patent is extended or adjusted under 35 U.S.C. 154(b) by 437 days.

(21) Appl. No.: 14/543,106

(22) Filed: Nov. 17, 2014

(65) Prior Publication Data

US 2015/0279040 A1 Oct. 1, 2015

Related U.S. Application Data

(63) Continuation of application No. PCT/CN2014/082911, filed on Jul. 24, 2014.

(30) Foreign Application Priority Data

Mar. 31, 2014 (CN) .......................... 2014 1 0126006

(51) Int. Cl.
*G08G 1/123* (2006.01)
*G06T 7/00* (2017.01)
(Continued)

(52) U.S. Cl.
CPC ............ *G06T 7/0044* (2013.01); *G01C 21/20* (2013.01); *G01C 21/34* (2013.01);
(Continued)

(58) Field of Classification Search
CPC .......... G06T 7/0044; G06T 7/74; G01C 21/20
(Continued)

(56) References Cited

U.S. PATENT DOCUMENTS 5,862,511 A 1/1999 Croyle et al.
5,948,043 A 9/1999 Mathis
(Continued)

FOREIGN PATENT DOCUMENTS

CN 1880918 A 12/2006
CN 1905722 A 1/2007
(Continued)

OTHER PUBLICATIONS

Decision on Grant A Patent for Invention dated Dec. 2, 2016, in counterpart Russian Application No. 2015134187/28(052520) and English translation thereof.
(Continued)

*Primary Examiner* — Muhammad Shafi
(74) *Attorney, Agent, or Firm* — Finnegan, Henderson, Farabow, Garrett & Dunner LLP

(57) ABSTRACT

A method for positioning and navigating for use in an electronic device, includes: obtaining an initial coordinate of a user; obtaining a preset number of one or more environment pictures in a preset geographic range corresponding to the initial coordinate, and obtaining an absolute coordinate corresponding to each of the obtained environment pictures from a preset correspondence relationship between different environment pictures and different absolute coordinates; obtaining, for each of the obtained environment pictures, a relative position between an object in the environment picture and the user; and determining current geographic position information of the user based on the relative position and the absolute coordinate.

16 Claims, 13 Drawing Sheets

(51) Int. Cl.
 G06K 9/00 (2006.01)
 G01C 21/20 (2006.01)
 G01C 21/34 (2006.01)
 G06T 7/73 (2017.01)

(52) U.S. Cl.
 CPC ............ G06K 9/00664 (2013.01); G06T 7/74 (2017.01); *G06T 2200/24* (2013.01); *G06T 2207/30244* (2013.01)

(58) Field of Classification Search
 USPC .......................................................... 701/448
 See application file for complete search history.

(56) References Cited

U.S. PATENT DOCUMENTS

| | | | | |
|---|---|---|---|---|
| 9,003,093 | B2* | 4/2015 | Wong | G06F 13/22 710/220 |
| 2002/0177950 | A1 | 11/2002 | Davies | |
| 2003/0176965 | A1 | 9/2003 | Padmanabhan | |
| 2008/0153516 | A1 | 6/2008 | Hsieh | |
| 2009/0005977 | A1 | 1/2009 | Chung et al. | |
| 2011/0064312 | A1 | 3/2011 | Janky et al. | |
| 2011/0118973 | A1 | 5/2011 | Shih et al. | |
| 2011/0214061 | A1* | 9/2011 | King | H04L 43/0882 715/736 |
| 2012/0047306 | A1* | 2/2012 | Mitsubayashi | G06F 13/4036 710/306 |
| 2012/0054604 | A1* | 3/2012 | Warncke-Wang | G06F 17/24 715/255 |
| 2012/0131645 | A1* | 5/2012 | Harm | G06F 21/6218 726/4 |
| 2014/0075073 | A1* | 3/2014 | Wong | G06F 13/22 710/220 |
| 2014/0189188 | A1* | 7/2014 | Whitby-Strevens | G06F 13/4027 710/310 |

FOREIGN PATENT DOCUMENTS

| | | |
|---|---|---|
| CN | 1967537 A | 5/2007 |
| CN | 101175280 A | 5/2008 |
| CN | 101334285 A | 12/2008 |
| CN | 101619976 A | 1/2010 |
| CN | 102413422 A | 4/2012 |
| CN | 102829775 A | 12/2012 |
| CN | 102889892 A | 1/2013 |
| CN | 102893129 A | 1/2013 |
| CN | 103052151 A | 4/2013 |
| CN | 103119965 A | 5/2013 |
| CN | 103167395 A | 6/2013 |
| CN | 103249142 A | 8/2013 |
| CN | 103398717 A | 11/2013 |
| CN | 103424113 A | 12/2013 |
| EP | 1059510 A1 | 12/2000 |
| JP | 2003014477 A | 1/2003 |
| JP | 2008215991 A | 9/2008 |
| JP | 2010197209 A | 9/2010 |
| JP | 2013025401 A | 2/2013 |
| KR | 20080029080 A | 4/2008 |
| KR | 20130089068 A | 8/2013 |
| KR | 20130108715 A | 10/2013 |
| SU | 1747905 A1 | 7/1992 |
| TW | 201142749 | 12/2011 |
| WO | WO 2005/038402 A1 | 4/2005 |
| WO | WO 2005/076031 A2 | 8/2005 |

OTHER PUBLICATIONS

Extended Search Report for European Application No. EP 14197062.4 from the European Patent Office, dated Apr. 24, 2015.
English version of International Search Report of PCT/CN2014/082911, from the State Intellectual Property Office of China, dated Jan. 9, 2015.
International Search Report of PCT/CN2014/082911, from the State Intellectual Property Office of China dated Jan. 9, 2015

* cited by examiner

METHOD AND DEVICE FOR POSITIONING AND NAVIGATING

CROSS REFERENCE TO RELATED APPLICATIONS

This application is a continuation of International Application No. PCT/CN2014/082911, filed Jul. 24, 2014, which is based upon and claims priority to Chinese Patent Application No. 201410126006.3, filed Mar. 31, 2014, the entire contents of all of which are incorporated herein by reference.

TECHNICAL FIELD

The present disclosure generally relates to the field of electronic technology and, more particularly, to a method and a device for positioning and navigating.

BACKGROUND

Applications having a map positioning function are used by users to determine current geographic positions and geographic positions of destinations to be reached, and to obtain routes for reaching the destinations.

In a conventional method for positioning and navigating, coordinate information of a user's current position is firstly obtained by positioning manners such as global positioning system (GPS) positioning, base station positioning, or wireless fidelity (Wi-Fi) positioning, A destination input by the user is then received, and coordinate information of the destination is obtained; and a route for reaching the destination is further determined based on the coordinate information of the user's current position and the coordinate information of the destination. In addition, in the conventional method, the user's orientation may also be obtained by a gyro or an electronic compass and provided to the user. In this way, the user may be guided to turn to a correct direction along the route, so as to reach the destination. As a result, a weight, volume and production cost of a device performing the conventional method can increase due to employing additional hardware components, such as the gyro or the electronic compass, to obtain the orientation of the user.

SUMMARY

According to a first aspect of the present disclosure, there is provided a method for positioning and navigating for use in an electronic device, comprising: obtaining an initial coordinate of a user; obtaining a preset number of one or more environment pictures in a preset geographic range corresponding to the initial coordinate, and obtaining an absolute coordinate corresponding to each of the obtained environment pictures from a preset correspondence relationship between different environment pictures and different absolute coordinates; obtaining, for each of the obtained environment pictures, a relative position between an object in the environment picture and the user; and determining current geographic position information of the user based on the relative position and the absolute coordinate.

According to a second aspect of the present disclosure, there is provided an electronic device for positioning and navigating, comprising: a processor; and a memory for storing instructions executable by the processor; wherein the processor is configured to: obtain an initial coordinate of a user; obtain a preset number of one or more environment pictures in a preset geographic range corresponding to the initial coordinate, and obtain an absolute coordinate corresponding to each of the obtained environment pictures from a preset correspondence relationship between different environment pictures and different absolute coordinates; obtain, for each of the obtained environment pictures, a relative position between an object in the environment picture and the user; and determine current geographic position information of the user based on the relative position and the absolute coordinate.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

In the present disclosure, an electronic device may be a mobile phone, a tablet computer, an E-book reader, an moving picture experts group audio layer III (MP3) player, an moving picture experts group audio layer IV (MP4) player, a laptop portable computer, a desktop computer, or the like.

Figure 1:
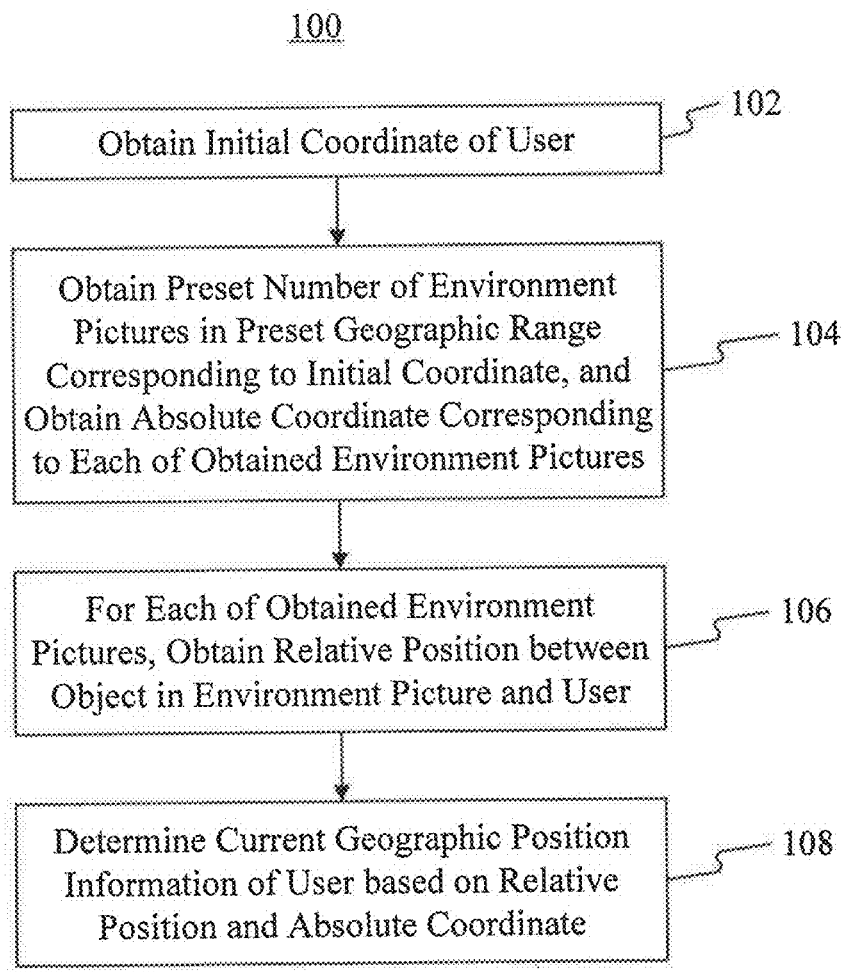
FIG. 1 is a flowchart of a method for positioning and navigating, according to an exemplary embodiment.

FIG. 1 is a flowchart of a method 100 for positioning and navigating, according to an exemplary embodiment. In the illustrated embodiment, the method 100 is used in an electronic device. Referring to FIG. 1, the method 100 includes the following steps.

In step 102, an initial coordinate of a user is obtained.

In step 104, a preset number of environment pictures in a preset geographic range corresponding to the initial coordinate are obtained, and an absolute coordinate corresponding to each of the obtained environment pictures is further obtained from a preset correspondence relationship between different environment pictures and different absolute coordinates.

In step 106, for each of the environment pictures, a relative position between an object in the environment picture and the user is obtained.

In step 108, current geographic position information of the user is determined based on the relative position and the absolute coordinate.

The method 100 overcomes the problem in the art that the weight, volume and production cost of an electronic device performing the conventional method for positioning and navigating increase due to employing additional hardware components, such as a gyro or an electronic compass to obtain an orientation of the user. In the method 100, the geographic position information of the user, including the orientation of the user, can be obtained without mounting additional hardware components, such as the gyro or the electronic compass, inside the electronic device, thereby reducing the weight and volume of the electronic device, and saving the production cost.

Figure 2A:
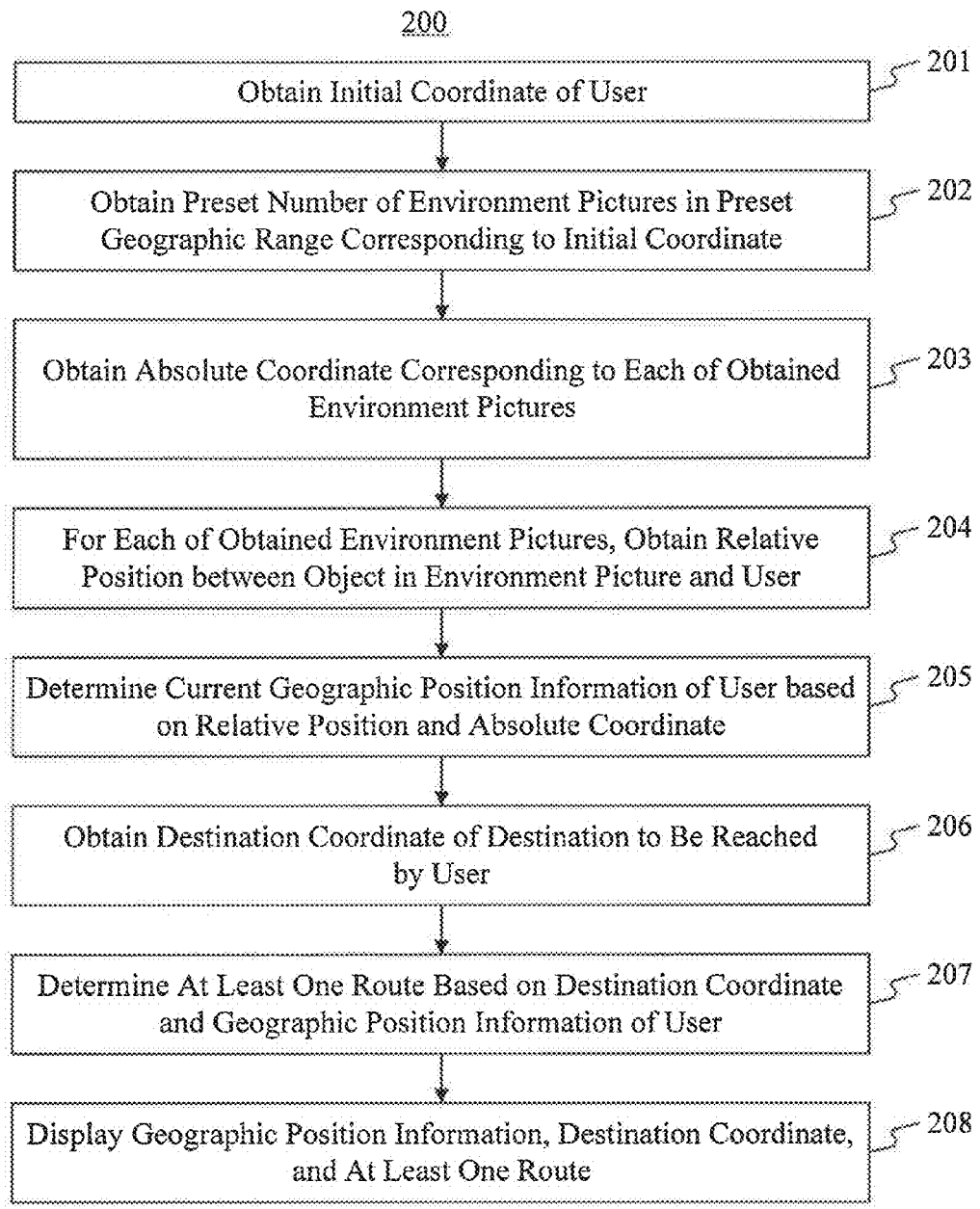
FIG. 2A is a flowchart of a method for positioning and navigating, according to an exemplary embodiment.

FIG. 2A is a flowchart of a method 200 for positioning and navigating, according to an exemplary embodiment. In the illustrated embodiment, the method 200 is used in an electronic device. Referring to FIG. 2A, the method 200 includes the following steps.

In step 201, an initial coordinate of a user is obtained.

In exemplary embodiments, the electronic device obtains the initial coordinate of the user by positioning manners such as global position system (GPS) positioning, base station positioning, or Wi-Fi positioning. The initial coordinate of the user is a coordinate corresponding to the user's current geographic position in an absolute coordinate system taking the earth as the coordinate system. Since different degrees of error may occur in these positioning manners, the initial coordinate of the user obtained by the electronic device may be considered a relatively rough value, that is, the initial coordinate may not be exactly the same as an actual coordinate of the geographic position where the user is currently and actually located.

For example, there may be an error of about 15 meters between the initial coordinate obtained by the GPS positioning and the current actual coordinate of the user. As another example, there may be an error of tens or even hundreds of meters between the initial coordinate obtained by the base station positioning or the Wi-Fi positioning and the current actual coordinate of the user.

In one exemplary embodiment, the initial coordinate of the user obtained by the above noted positioning manners is a two-dimensional coordinate, in which an altitude of the geographic position where the user is actually located is not included. In another embodiment, a three-dimensional initial coordinate may be obtained by the above noted positioning manners, or by further combining information obtained by additional components such as a pressure altimeter.

In step 202, a preset number of environment pictures in a preset geographic range corresponding to the initial coordinate are obtained.

In exemplary embodiments, after obtaining the initial coordinate of the user, the electronic device obtains a preset number of environment pictures in a preset geographic range corresponding to the initial coordinate, which may include the following substeps.

In a first substep, one or more candidate pictures, e.g., m candidate pictures, in the preset geographic range corresponding to the initial coordinate are obtained.

For example, a plurality of candidate pictures are pre-stored in the electronic device or a server corresponding to an application program for implementing the method 200. The candidate pictures are generally pictures of landmark architectures or landscapes of various places, such as peaks, towers, high buildings, schools, stores, etc. The candidate pictures may be manually collected and obtained in advance in various places, or may be obtained by collecting pictures uploaded from various users.

In addition, a correspondence relationship between different candidate pictures and different absolute coordinates is stored in the electronic device or the server. An absolute coordinate corresponding to a candidate picture may be a coordinate corresponding to the geographic position where an object in the candidate picture is actually located in the absolute coordinate system taking the earth as the coordinate system. In exemplary embodiments, the absolute coordinates have been modified and corrected for a long period of time. Therefore it may be regarded that the absolute coordinate corresponding to each candidate picture is an exact coordinate, that is, the absolute coordinate reflects the exact geographic position where the object in the candidate picture is actually located.

After obtaining the initial coordinate of the user, the electronic device determines the preset geographic range according to the initial coordinate. For example, a circular region taking the initial coordinate as a center and having a radius of 500 meters is determined to be the preset geographic range. Then, the electronic device obtains the m candidate pictures and corresponding absolute coordinates in the preset geographic range.

In a second substep, the preset number of environment pictures, e.g., n environment pictures, are selected from the m candidate pictures, where m≥n>0.

In one exemplary embodiment, the m candidate pictures are ordered according to a preset priority so as to obtain a candidate picture sequence, and n environment pictures are selected from the candidate picture sequence as the obtained preset environment pictures.

For example, after obtaining the m candidate pictures in the preset geographic range corresponding to the initial coordinate, the electronic device may order the m candidate pictures according to a preset priority so as to obtain a candidate picture sequence. For example, the electronic device orders the candidate pictures according to a distance between each of the absolute coordinates corresponding to different candidate pictures and the initial coordinate, so as to obtain a candidate picture sequence. The candidate picture sequence sequentially includes the m candidate pictures with the distances between the absolute coordinates and the initial coordinate from near to far, with a nearer distance corresponding to a higher priority.

Then, the electronic device automatically selects n environment pictures from the candidate picture sequence. Generally, the electronic device selects the n candidate pictures with a higher priority to obtain the preset environment pictures. The environment pictures refer to pictures of an environment surrounding the geographic position where the user is currently and actually located. The number n may be manually preset, or may be preset to 1, 2, or 3 according to different methods provided in the present disclosure. The number n may also be set to other values, which the present disclosure does not limit.

In another exemplary embodiment, a part or all of the m candidate pictures are displayed on the electronic device, and a selection signal corresponding to n selected candidate pictures is received to determine the n environment pictures.

For example, after obtaining the m candidate pictures, the electronic device may also display a part or all of the m candidate pictures. The user then selects n candidate pictures from these candidate pictures as environment pictures. In the illustrated embodiment, according to a current and actual surrounding environment, the user may select the environment pictures corresponding to objects that can be clearly seen by the user or have a nearer distance from the user, which improves the accuracy of subsequent positioning, and improves user interaction and interest.

In step 203, an absolute coordinate corresponding to each of the obtained environment pictures is further obtained from a preset correspondence relationship between different environment pictures and different absolute coordinates.

As described above in step 202, a correspondence relationship between different candidate pictures and different absolute coordinates is stored in the electronic device or the server. The absolute coordinate is a coordinate corresponding to the geographic position where an object in the candidate picture is actually located in the absolute coordinate system taking the earth as the coordinate system. After obtaining the environment pictures, the electronic device obtains the absolute coordinate corresponding to each of the obtained environment pictures according to the correspondence relationship.

In step 204, for each of the obtained environment pictures, a relative position between an object in the environment picture and the user is obtained.

In exemplary embodiments, for each of the obtained environment pictures, the electronic device obtains a relative position between an object in the environment picture and the user, which may be based on interaction with the user. Step 204 may include the following substeps.

In a first substep, the obtained environment pictures and guide information are displayed, the guide information being provided to guide the user to face an object in a displayed environment picture, and guide the user to move the displayed environment picture on a screen of the electronic device in a corresponding direction and/or to a corresponding position according to the relative position between the object in the environment picture and the user.

In a second substep, an input signal triggered by the user according to the guide information is received.

In a third substep, the relative position between the object in the environment picture and the user is determined according to the input signal.

Figure 2B:
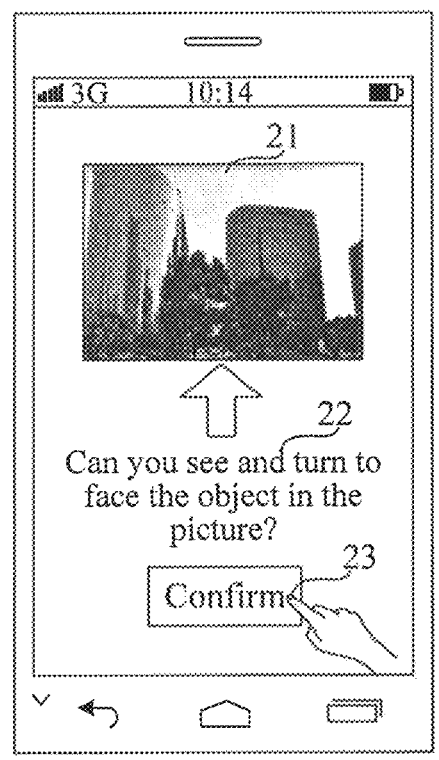
FIGS. 2B-2E are schematic diagrams illustrating methods for obtaining a relative position, according to exemplary embodiments.

FIGS. 2B-2E are schematic diagrams illustrating methods for obtaining a relative position, according to exemplary embodiments. Referring to FIG. 2B, in one exemplary embodiment, one environment picture 21 is obtained at step 202, i.e., n=1. The electronic device displays the environment picture 21 and guide information 22. For example, the guide information 22 is "Can you see and turn to face the object in the picture?" After seeing the environment picture 21 and the guide information 22, the user turns to face the object in the environment picture 21 according to the guide information 22, and presses a "confirm" button 23. After receiving a confirm signal generated from the user's pressing of the "confirm" button 23, the electronic device obtains the relative position between the object in the environment picture 21 and the user as the object in the environment picture being in front of the user.

Figure 2C:
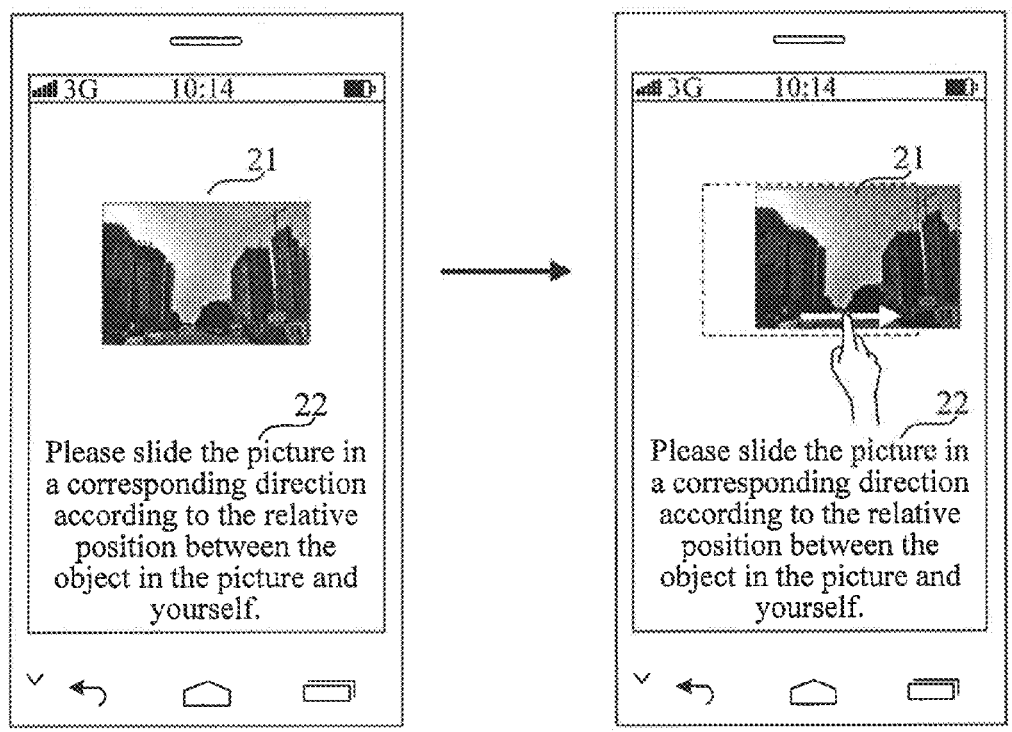

Referring to FIG. 2C, in one exemplary embodiment, one environment picture 21 is obtained at step 202, i.e., n=1. The electronic device displays the environment picture 21 and guide information 22. For example, the guide information 22 is "Please slide the picture in a corresponding direction according to the relative position between the object in the picture and yourself." After seeing the environment picture 21 and the guide information 22, the user firstly determines the relative position between the object in the environment picture 21 and the user, for example, the user determines that the object is on the user's right. The user then slides the environment picture 21 on the screen of the electronic device for a certain distance in the right direction. After detecting a sliding signal generated from the user's sliding operation, the electronic device determines the relative position between the object in the environment picture 21 and the user according to the sliding direction as the object in the environment picture being on the right of the user.

In exemplary embodiments, the sliding direction may be arbitrary, and any sliding direction corresponds to one relative position. For example, sliding upward corresponds to the object in the environment picture being in front of the user, sliding rightward corresponds to the object in the environment picture being on the right of the user, sliding leftward corresponds to the object in the environment picture being on the left of the user, sliding downward corresponds to the object in the environment picture being in the rear of the user, sliding upper right 45° corresponds to the object in the environment picture being in front right 45° of the user, sliding upper left 30° corresponds to the object in the environment picture being on front left 30° of the user, and so on.

Figure 2D:
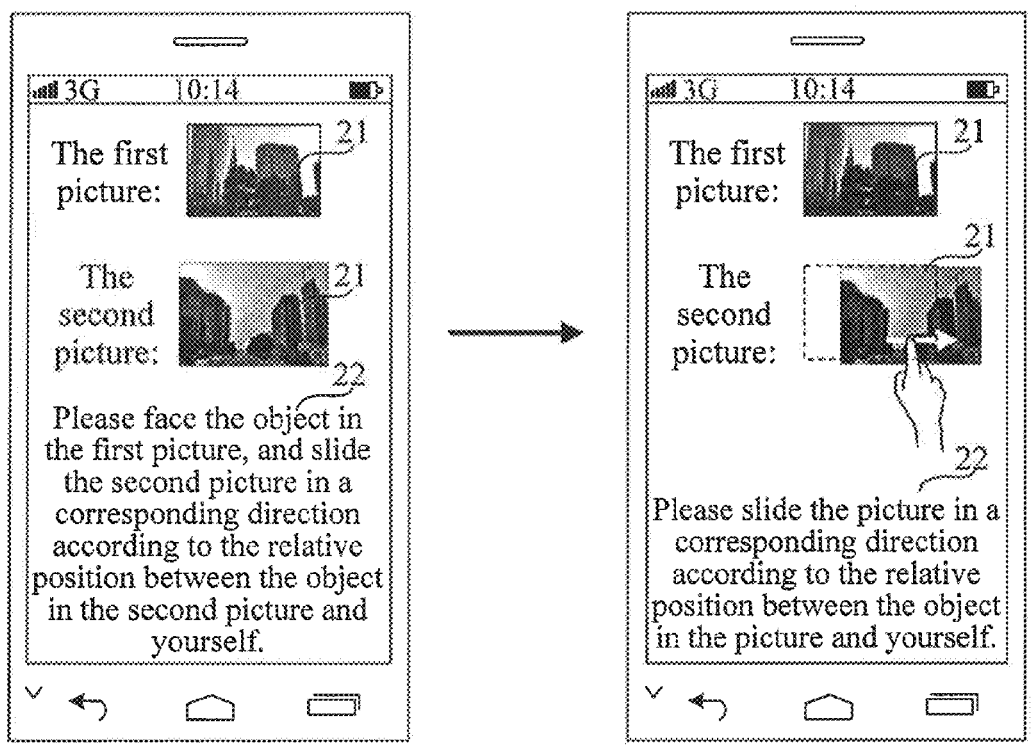

Referring to FIG. 2D, in one exemplary embodiment, two environment pictures 21 are obtained at step 202, i.e., n=2. The electronic device displays the two environment pictures 21 and guide information 22. For example, the guide information 22 may be "Please face the object in the first picture, and slide the second picture in a corresponding direction according to the relative position between the object in the second picture and yourself," After seeing the two environment pictures 21 and the guide information 22, according to the guide information 22, the user firstly turns to face the object in the first environment picture 21, and determines the relative position between the object in the second environment picture 21 and the user, for example, the user determines that the object in the second environment picture is on the user's right. The user then slides the second environment picture 21 on the screen of the electronic device for a certain distance in a right direction. After detecting a sliding signal generated from the user's sliding operation, the electronic device obtains relative positions between objects in the two environment pictures 21 and the user, respectively, as the object in the first environment picture 21 being in front of the user, and the object in the second environment picture 21 being on the right of the user.

In another embodiment, the guide information (not shown) may also be "Please slide the pictures in corresponding directions, respectively, according to the relative positions between the objects in the pictures and yourself." Thus, the electronic device may determine the relative positions between the objects in the two environment pictures 21 and the user, respectively, according to two sliding directions.

Figure 2E:
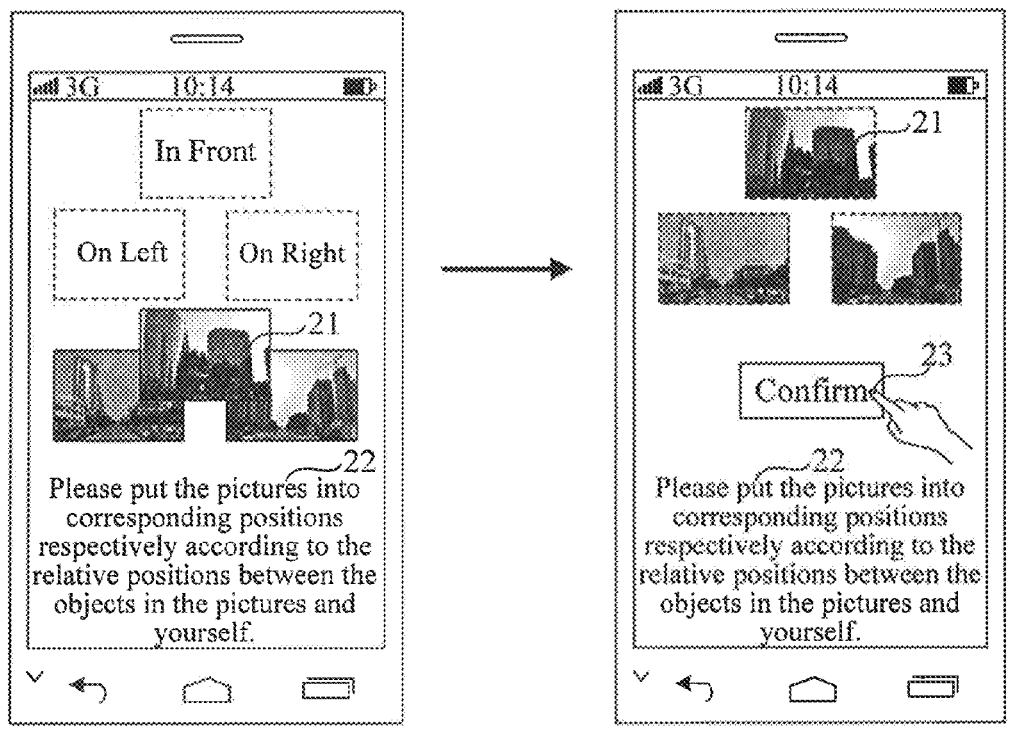

Referring to FIG. 2E, in one exemplary embodiment, three environment pictures 21 are obtained at step 202, i.e., n=3. The electronic device displays the three environment pictures 21 and guide information 22. For example, the guide information 22 may be "Please put the pictures into corresponding positions, respectively, according to the relative positions between the objects in the pictures and yourself." After seeing the three environment pictures 21 and the guide information 22, according to the guide information 22, the user determines the relative positions between the objects in the three environment pictures 21 and the user, respectively, for example, the user determines that the object in the first environment picture 21 is in front of the user, the object in the second environment picture 21 is on the left of the user, and the object in the third environment picture 21 is on the right of the user. The user then puts the three environment pictures 21 into corresponding boxes displayed on the screen, respectively, and then presses the "confirm" button 23. After receiving a confirm signal generated from the user's pressing on the "confirm" button 23, the electronic device obtains the relative positions between the objects in the three environment pictures 21 and the user, respectively, as the object in the first environment picture being in front of the user, the object in the second environment picture being on the right of the user, and the object in the third environment picture being on the left of the user.

In exemplary embodiments, the relative position between the object in any of the three environment pictures 21 and the user may be obtained according to a sliding direction of any angular degree, which the present disclosure does not limit.

Still referring to FIG. 2A, in step 205, current geographic position information of the user is determined based on the relative position and the absolute coordinate corresponding to each of the obtained environment pictures.

In exemplary embodiments, after obtaining the relative position between the object in each of the obtained environment pictures and the user and the absolute coordinate of the object in each of the obtained environment pictures, the electronic device determines current geographic position information of the user based on the relative position and the absolute coordinate. The current geographic position information includes an actual coordinate and an orientation of the user.

In exemplary embodiments, one environment picture is obtained (FIGS. 2B and 2C). Accordingly, the electronic device determines current geographic position information of the user as follows, as illustrated in FIGS. 2F and 2G corresponding to FIGS. 2B and 2C, respectively.

Figure 2F:
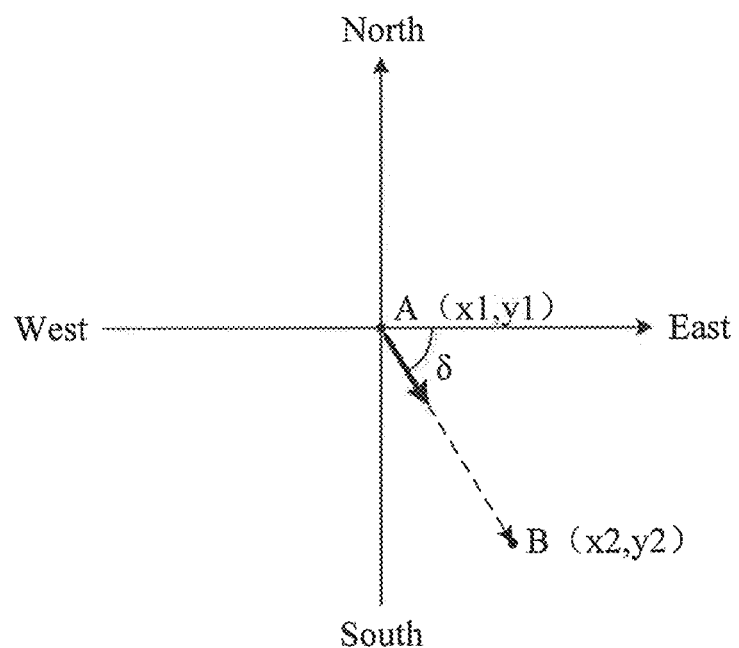
FIGS. 2F-2I are schematic diagrams illustrating methods for determining geographic position information, according to exemplary embodiments.
Figure 2G:
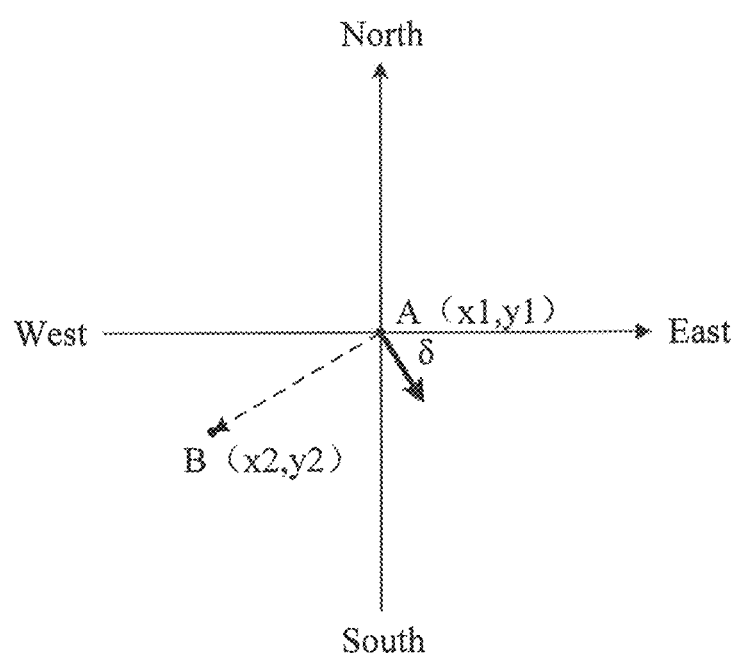

Referring to FIGS. 2B and 2F, and also FIGS. 2C and 2G, when the number of the obtained environment pictures is one, the initial coordinate of the user is determined as an actual coordinate of the user, and a current orientation of the user is determined based on the relative position obtained for the environment picture, the absolute coordinate corresponding to the environment picture, and the initial coordinate of the user.

First, the initial coordinate of the user is determined as the actual coordinate of the user. In the illustrated embodiment, although the initial coordinate may not be an exact coordinate of the user, it can reflect within a permissible error-range the geographic position where the user is currently and actually located.

Second, the current orientation of the user is determined based on the relative position between the object in the environment picture and the user, the absolute coordinate corresponding to the environment picture, and the initial coordinate of the user. This determination of the orientation of the user may further include first and second substeps:

In a first substep, a reference direction from a coordinate point A, corresponding to the initial coordinate of the user, to a coordinate point B, corresponding to the absolute coordinate of the environment picture, is obtained.

Referring to FIGS. 2F and 2C in the illustrated embodiment, the absolute coordinate system is a two-dimensional rectangular coordinate system where an up direction represents the north direction, a down direction represents the south direction, a left direction represents the west direction, and a right direction represents the east direction. It is assumed that the initial coordinate of the user is (x1, y1), and the absolute coordinate corresponding to the environment picture is (x2, y2), a reference direction from the coordinate point A to the coordinate point B, indicated by a dotted arrow in each of FIGS. 2F and 2C, can be obtained.

In a second substep, the orientation of the user is determined based on the reference direction and the relative position.

Referring to FIGS. 2B and 2F, when the relative position between the object in the environment picture and the user is the object being in front of the user, the reference direction from the coordinate point A(x1, y1) to the coordinate point B(x2, y2) is determined as the orientation of the user, indicated by a solid arrow in FIG. 2F. Then, an angle δ between this orientation and, e.g., the east direction in the absolute coordinate system, may be further calculated as δ=arctan |(y2−y1)/(x2−x1)|.

Referring to FIGS. 2C and 2G, when the relative position between the object in the environment picture and the user is the object in the environment picture being on the right of the user, the orientation of the user, indicated by a solid arrow in FIG. 2G, is a direction obtained by rotating the reference direction from the coordinate point A(x1, y1) to the coordinate point B(x2, y2) by 90° counterclockwise. Then, an angle δ between the orientation of the user and, e.g., the east direction in the absolute coordinate system may be further calculated as δ=arctan |(x2−x1)/(y2−y1)|.

In addition, when the relative position is the object in the environment picture being on the left of the user, the orientation of the user is a direction obtained by rotating the reference direction from the coordinate point A to the coordinate point B by 90° clockwise (not shown). Further, when the relative position is the object in the environment picture being on front left 30° of the user, for example, the orientation of the user is a direction obtained by rotating the reference direction from the coordinate point A to coordinate point B by 30° clockwise. Thus, the electronic device may determine the orientation of the user based on the reference direction and the relative position.

In the above embodiments, the angle δ between the orientation of the user and the east direction in the absolute coordinate system is calculated. In actual applications, an angle between the orientation of the user and any direction in the absolute coordinate system may be calculated.

In exemplary embodiments, two environment pictures, including first and second environment pictures, are obtained (FIG. 2D). Accordingly, the electronic device determines current geographic position information of the user as follows, illustrated in FIG. 2H.

Figure 2H:
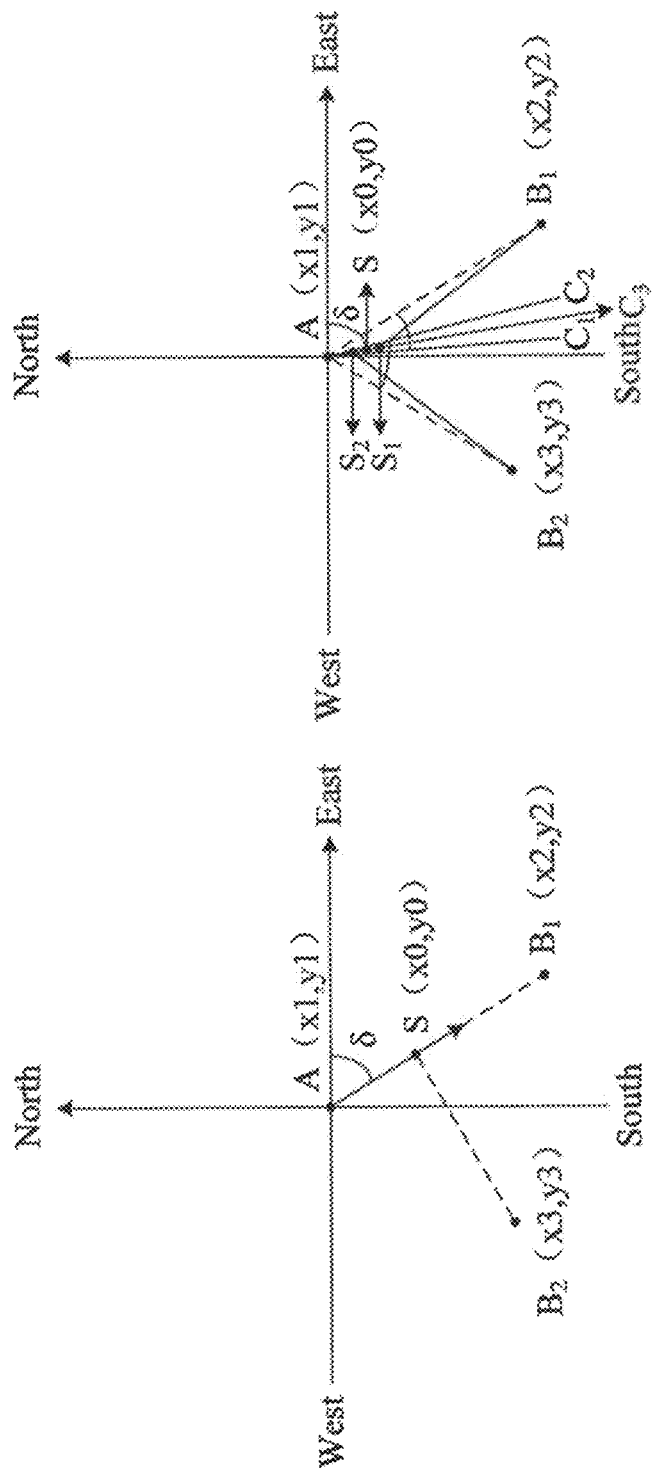

Referring to FIGS. 2D and 2H, when the number of the obtained environment pictures is two, the current orientation and the actual coordinate of the user are determined based on the relative positions obtained for the first and second environment pictures, respectively, the absolute coordinates corresponding to the first and second environment pictures, respectively, and the initial coordinate of the user.

In one exemplary embodiment, referring to the left portion of FIG. 2H, a straight line $AB_1$ is obtained, and the straight line $AB_1$ passes through a coordinate point A corresponding to the initial coordinate (x1, y1) of the user and a coordinate point $B_1$ corresponding to the absolute coordinate (x2, y2) of the first environment picture. The actual coordinate of the user is determined based on a coordinate point $B_2$ corresponding to the absolute coordinate (x3, y3) of the second environment picture, the straight line $AB_1$, and relative positions obtained for the first and second environment pictures, respectively. The orientation of the user is determined based on the actual coordinate of the user and at least one of the relative positions, using the following substeps.

In a first substep, the straight line $AB_1$ passing the coordinate point A and the coordinate point $B_1$ is obtained. For example, the coordinate point $B_1$ is selected based on the absolute coordinate (x2, y2) corresponding to the first environment picture, and the straight line $AB_1$ is obtained by linking the coordinate point A(x1, y1) and the coordinate point $B_1$(x2, y2).

In the present embodiment, it is assumed that the relative position between the object corresponding to the coordinate point $B_1$(x2, y2) and the user is the object being in front of the user. The straight line $AB_1$, indicated by the dotted line, is obtained by linking the coordinate point A(x1, y1) and the coordinate point $B_1$(x2, y2).

In a second substep, the actual coordinate of the user is determined based on the coordinate point $B_2$(x3, y3), the straight line $AB_1$, and the relative positions obtained for the first and second environment pictures, respectively.

In the illustrated embodiment, the relative position between the object corresponding to the coordinate point $B_1$(x2, y2) and the user is the object being in front of the user, and the relative position between the object corresponding to the coordinate point $B_2$(x3, y3) and the user is the object being on the left of the user. Accordingly, an angle $\angle B_1SB_2$, which is formed by taking a coordinate point S corresponding to the user's actual coordinate as a vertex and taking a straight line $SB_1$ and a straight line $SB_2$ as two sides of the angle, should be 90°. Thus, by drawing the line $SB_2$ perpendicular to the line $AB_1$, a coordinate (x0, y0) of the perpendicular foot at the coordinate point S can be determined as the actual coordinate of the user.

In another embodiment, the relative position between the object corresponding to the coordinate point $B_1$(x2, y2) and the user is the object being on front left 30° of the user, and the relative position between the object corresponding to the coordinate point $B_2$(x3, y3) and the user is the object being on front right 45° of the user. Accordingly, an angle $\angle B_1SB_2$, which is formed by taking the coordinate point S corresponding to the user's actual coordinate as the vertex and taking the line $SB_1$ and the line $SB_2$ as two sides of the angle, should be 75°. Thus, the coordinate point S can be found on the straight line $AB_1$ such that the angle $\angle B_1SB_2=75°$. Therefore, the coordinate (x0, y0) of the coordinate point S is determined as the actual coordinate of the user.

In a third substep, the orientation of the user is determined based on the actual coordinate of the user and at least one of the relative positions.

After obtaining the actual coordinate S(x0, y0) of the user, the orientation of the user is determined further based on one or two of the relative positions. Because the relative position between the object corresponding to the coordinate point $B_1$(x2, y2) and the user is the object being in front of the user, the orientation of the user is the direction of the line $SB_1$, indicated by a solid arrow in the left portion of FIG. 2H. Then, an angle δ between the orientation of the user and, e.g., the east direction in the absolute coordinate system may be further calculated as $δ=\arctan |(y0-y1)/(x0-x1)|$.

In the above embodiment illustrated in the left portion of FIG. 2H, there is a higher requirement for selecting the coordinate point $B_1$ in the absolute coordinates corresponding to the first and second environment pictures, respectively. The accuracy of the relative position between the object corresponding to the coordinate point $B_1$ and the user may affect the accuracy of the calculated actual coordinate and orientation of the user. Thus, in some embodiments, the coordinate point corresponding to the object in front of the user is selected as the coordinate point $B_1$ for obtaining the reference direction.

In addition, the initial coordinate of the user obtained by different positioning manners such as the GPS positioning, the base station positioning, or the Wi-Fi positioning are different, and the GPS positioning generally has a higher accuracy than the base station or Wi-Fi positioning. Thus, when the GPS positioning function of the electronic device is turned on, the midpoint of the segment AS in the left portion of FIG. 2H may be selected as the coordinate point corresponding to the user's actual coordinate. When the GPS positioning function of the electronic device is turned off, the point S in the left portion of FIG. 2H may be selected as the coordinate point corresponding to the user's actual coordinate. In actual applications, different algorithms may be selected according to actual requirements to obtain the user's actual coordinate, which is not limited in the present disclosure.

In one exemplary embodiment, referring to the right portion of FIG. 2H, a straight line $AB_1$ and a straight line $AB_2$ are obtained. The straight line $AB_1$ passes through a coordinate point A corresponding to the initial coordinate (x1, y1) of the user and a coordinate point $B_1$ corresponding to the absolute coordinate (x2, y2) of the first environment picture, and the straight line $AB_2$ passes through the coordinate point A and a coordinate point $B_2$ corresponding to the absolute coordinate (x3, y3) of the second environment picture. Accordingly, the orientation of the user is determined based on the straight line $AB_1$, the straight line $AB_2$, and the relative positions obtained for the first environment picture and the second environment picture, respectively, and the actual coordinate of the user is determined based on the orientation of the user and at least one of the relative positions, using the following substeps.

In a first substep, the straight line $AB_1$ which passes through the coordinate point A and the first coordinate point $B_1$ and the straight line $AB_2$ which passes through the coordinate point A and the second coordinate point $B_2$ are obtained.

In the present embodiment, it is assumed that the relative position between the object in the first environment picture and the user (obtained for the first environment picture at step 204) is that the object is on front left 30° of the user, and the relative position between the object in the second environment picture and the user (obtained for the second environment picture at step 204) is that the object is on front right 45° of the user. The line $AB_1$ is obtained by linking the coordinate point $B_1$(x2, y2) and the coordinate point A(x1, y1), and the line $AB_2$ is obtained by linking the coordinate point $B_2$(x3, y3) and the coordinate point A(x1, y1).

In a second substep, the orientation of the user is determined based on the straight line $AB_1$, the straight line $AB_2$, and the relative positions obtained for the first environment picture and the second environment picture, respectively.

For example, a first candidate orientation is determined based on the straight line $AB_1$ and the relative position between the object in the first environment picture and the user. In the illustrated embodiment, because the relative position between the object in the first environment picture and the user is the object being on front left 30° of the user, an angle $\angle B_1AC_1$ is formed by taking A(x1, y1) as the vertex of the angle, taking the straight line $AB_1$ as one side of the angle, and then rotating the straight line $AB_1$ by 30° counterclockwise to obtain a radial line $AC_1$ as another side of the angle. The direction of the radial line $AC_1$ is determined as the first candidate direction.

Then, a second candidate orientation is determined based on the straight line $AB_2$ and the relative position between the object in the second environment picture and the user. In the illustrated embodiment, because the relative position between the object in the second environment picture and the user is the object being on front right 45° of the user, an angle $\angle B_2AC_2$ is formed by taking $A(x1, y1)$ as the vertex of the angle, taking the straight line $AB_2$ as one side of the angle, and rotating the straight line $AB_2$ by 45° clockwise to obtain a radial line $AC_2$ as another side of the angle. The direction of the radial line $AC_2$ is determined as the second candidate direction.

Further, an angular bisector $AC_3$ of the angle $\angle C_1AC_2$ is provided. A direction of the radial line $AC_3$ is determined as the orientation of the user.

In a third substep, the actual coordinate of the user is determined based on the orientation of the user and at least one of the relative positions obtained for the first environment picture and the second environment picture, respectively.

For example, after determining the orientation of the user, a coordinate point $S_1$ and a coordinate point $S_2$ are selected on the line $AC_3$ such that an angle $\angle B_1S_1C_3=30°$ and an angle $\angle B_2S_2C_3=45°$. When the coordinate point $S_1$ and the coordinate point $S_2$ coincide with each other, the coordinate point $S_1$ ($S_2$) is selected as the coordinate point S (x0, y0) corresponding to the user's actual coordinate, and when the coordinate point $S_1$ and the coordinate point $S_2$ do not coincide with each other, a midpoint of the line segment $S_1S_2$ is selected as the coordinate point S (x0, y0) corresponding to the user's actual coordinate.

Then, an angle δ between the orientation of the user and, e.g., the east direction in the absolute coordinate system may be further calculated as δ=arctan |(y0−y1)/(x0−x1)|.

In the above embodiment illustrated in the right portion of FIG. 2H, position relations between the user and the objects in the first and second environment pictures, respectively, are both considered when calculating the orientation and the actual coordinate of the user, and the orientation and the actual coordinate of the user are determined by an averaging algorithm based on two candidate orientations, so that accuracy of the calculation result is improved.

In exemplary embodiments, three environment pictures, including first, second, and third environment pictures, are obtained (FIG. 2E). Accordingly, the electronic device determines current geographic position information of the user as follows, as illustrated in FIG. 2I.

Figure 2I:
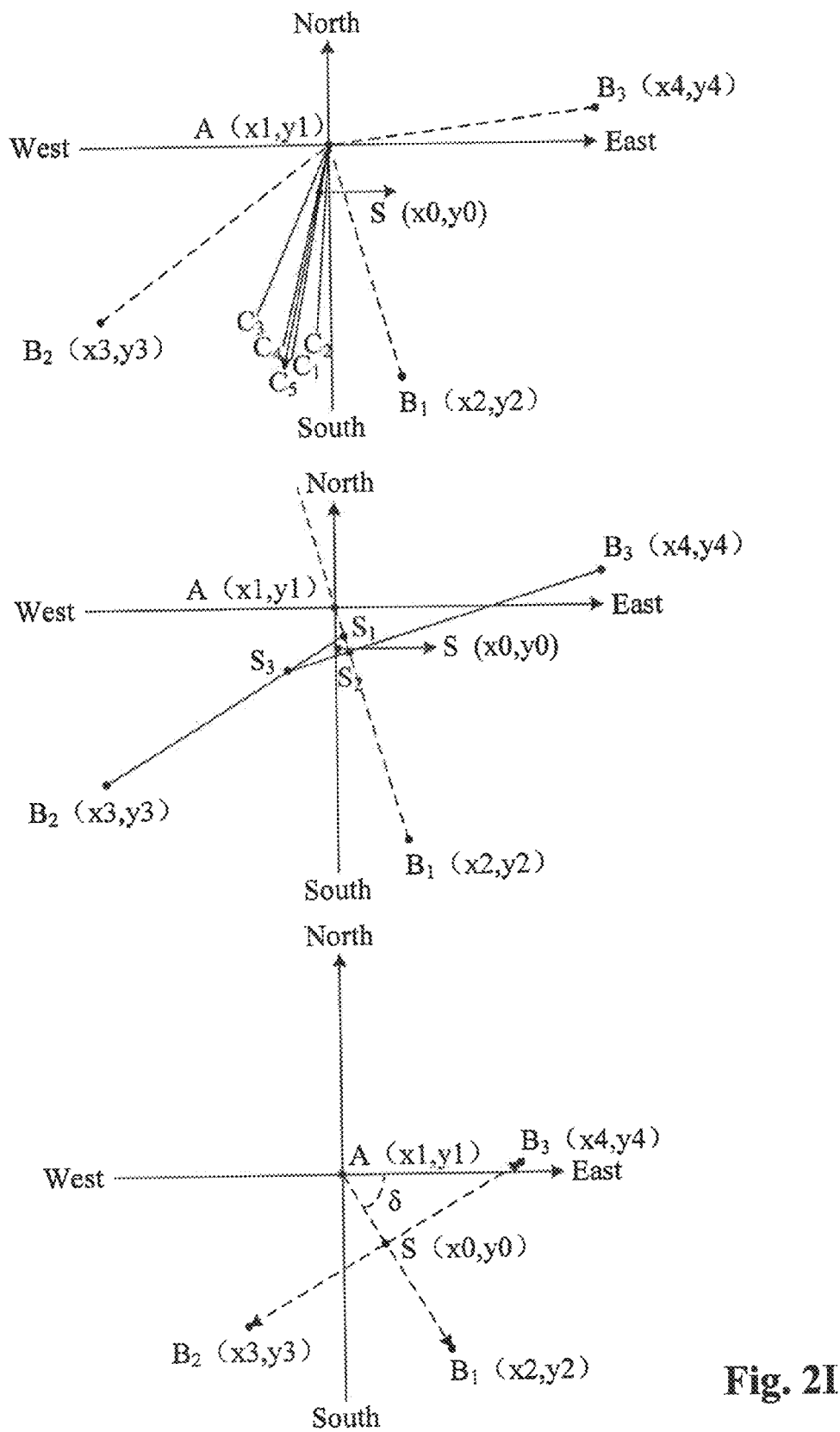

In one exemplary embodiment, referring to the upper portion of FIG. 2I, a straight line $AB_1$, a straight line $AB_2$, and a straight line $AB_3$ are obtained. The straight line $AB_1$ passes through a coordinate point A corresponding to the initial coordinate (x1, y1) of the user and a coordinate point $B_1$ corresponding to the absolute coordinate (x2, y2) of the first environment picture. The straight line $AB_2$ passes through the coordinate point A and a coordinate point $B_2$ corresponding to the absolute coordinate (x3, y3) of the second environment picture. The straight line $AB_3$ passes through the coordinate point A and a coordinate point $B_3$ corresponding to the absolute coordinate (x4, y4) of the third environment picture. The orientation of the user is determined based on the straight line $AB_1$, the straight line $AB_2$, the straight line $AB_3$, and the relative positions obtained for the first environment picture, the second environment picture, and the third environment picture, respectively; and the actual coordinate of the user is determined based on the orientation of the user and at least one of the relative positions, using the following substeps.

In a first substep, the straight line $AB_1$ which passes through the coordinate point A corresponding to the initial coordinate of the user and the coordinate point $B_1$, the straight line $AB_2$ which passes through the coordinate point A and the coordinate point $B_2$, and the straight line $AB_3$ which passes through the coordinate point A and the coordinate point $B_3$ are obtained.

In the present embodiment, it is assumed that the relative position between the object in the first environment picture and the user is the object being on front left 30° of the user, the relative position between the object in the second environment picture and the user is the object being on front right 45° of the user, and the relative position between the object in the third environment picture and the user is the object being on front left 120° of the user. Referring to the upper portion of FIG. 2I, the straight line $AB_1$ is obtained by linking the coordinate point $B_1(x2, y2)$ and the coordinate point $A(x1, y1)$, the straight line $AB_2$ is obtained by linking the coordinate point $B_2(x3, y3)$ and the coordinate point $A(x1, y1)$, and the straight line $AB_3$ is obtained by linking the coordinate point $B_3(x4, y4)$ and the coordinate point $A(x1, y1)$, as indicated by the dotted lines.

In a second substep, the orientation of the user is determined based on the straight line $AB_1$, the straight line $AB_2$, the straight line $AB_3$, and the relative positions obtained for the first environment picture, the second environment picture, and the third environment picture, respectively.

For example, a first candidate orientation is determined based on the straight line $AB_1$ and the relative position between the object in the first environment picture and the user. In the illustrated embodiment, because the relative position between the object in the first environment picture and the user is the object being on front left 30° of the user, an angle $\angle B_1AC_1$ is formed by taking $A(x1, y1)$ as the vertex of the angle, taking the straight line $AB_1$ as one side of the angle, and rotating the straight line $AB_1$ by 30° counterclockwise to obtain a radial line $AC_1$ as another side of the angle. The direction of the radial line $AC_1$ is determined as the first candidate direction.

A second candidate orientation is determined based on the straight line $AB_2$ and the relative position between the object in the second environment picture and the user. In the illustrated embodiment, because the relative position between the object in the second environment picture and the user is the object being on front right 45° of the user, an angle $\angle B_2AC_2$ is formed by taking $A(x1, y1)$ as the vertex of the angle, taking the straight line $AB_2$ as one side of the angle, and rotating the straight line $AB_2$ by 45° clockwise to obtain a radial line $AC_2$ as another side of the angle. The direction of the radial line $AC_2$ is determined as the second candidate direction.

A third candidate orientation is determined based on the straight line $AB_3$ and the relative position between the object in the third environment picture and the user. In the illustrated embodiment, because the relative position between the object in the third environment picture and the user is the object being on front left 120° of the user, an angle $\angle B_3AC_3$ is formed by taking $A(x1, y1)$ as the vertex of the angle, taking the straight line $AB_3$ as one side of the angle, and rotating the straight line $AB_3$ by 120° clockwise to obtain a radial line $AC_3$ as anther side of the angle. The direction of the radial line $AC_3$ is determined as the third candidate direction.

An angular bisector $AC_4$ of an angle $\angle C_2AC_3$ is provided, and an angular bisector $AC_5$ of an angle $\angle C_1AC_4$ is also provided. The direction of the radial line $AC_5$ is determined as the orientation of the user.

In a third substep, the actual coordinate of the user is further determined based on the orientation of the user and at least one of the relative positions obtained for the first environment picture, the second environment picture, and the third environment picture, respectively.

For example, a coordinate point $S_1$, a coordinate point $S_2$, and a coordinate point $S_3$ (not shown) are selected on the straight line $AC_5$ such that an angle $\angle B_1S_1C_5=30°$, an angle $\angle B_2S_2C_5=45°$, and an angle $\angle B_3S_3C_5=120°$. When the coordinate point $S_1$, the coordinate point $S_2$, and the coordinate point $S_3$ coincide with each other, the coordinate point $S_1$ ($S_2/S_3$) is selected as the coordinate point S (x0, y0) corresponding to the user's actual coordinate. When the coordinate point $S_1$, the coordinate point $S_2$, and the coordinate point $S_3$ do not coincide with each other, a midpoint of a line segment formed by two of the coordinate point $S_1$, the coordinate point $S_2$, and the coordinate point $S_3$ is selected as the coordinate point S (x0, y0) corresponding to the user's actual coordinate. Then, an angle δ between the orientation of the user and the east direction in the absolute coordinate system may be further calculated as δ=arctan |(y0−y1)/(x0−x1)|.

In one exemplary embodiment, referring to the middle portion of FIG. 2I, a straight line $AB_1$ which passes through the coordinate point A corresponding to the initial coordinate (x1, y1) of the user and a coordinate point $B_1$ corresponding to the absolute coordinate (x2, y2) of the first environment picture is obtained.

In the present embodiment, it is assumed that the relative position between the object corresponding to the coordinate point $B_1$(x2, y2) and the user is the object being on front left 30° of the user. The straight line $AB_1$ is obtained by linking the coordinate point A(x1, y1) and the coordinate point $B_1$(x2, y2), as indicated by the dotted line.

The actual coordinate of the user is determined based on a coordinate point $B_2$ corresponding to the absolute coordinate (x3, y3) of the second environment picture, a coordinate point $B_3$ corresponding to the absolute coordinate (x4, y4) of the third environment picture, the straight line $AB_1$, and the relative positions obtained for the first environment picture, the second environment picture, and the third environment picture, respectively.

In the illustrated embodiment, because the relative position between the object in the first environment picture and the user is the object being on front left 30° of the user, the relative position between the object in the second environment picture and the user is the object being on front right 45° of the user, and the relative position between the object in the third environment picture and the user is the object being on front left 120° of the user, a coordinate point $S_1$ and a coordinate point $S_2$ are selected on the straight line $AB_1$ such that an angle $\angle B_2S_1B_1=30°+45°=75°$ and an angle $\angle B_3S_2B_1=120°-30°=90°$. A coordinate of a midpoint of a line segment $S_1S_2$ may be selected as the actual coordinate of the user (not shown). Alternatively, an inverted extension line may be provided along a straight line $B_3S_2$ to cross with a straight line $B_2S_1$ at the coordinate point $S_3$, and the coordinate (x0, y0) of a central point S of a triangle $\Delta S_1S_2S_3$ may be selected as the actual coordinate of the user.

The orientation of the user is further determined based on the actual coordinate of the user and at least one of the relative positions obtained for the first environment picture, the second environment picture, and the third environment picture, respectively, similar to the above description in connection with FIG. 2H.

In one exemplary embodiment, referring to the lower portion of FIG. 2I, an algorithm is provided for use when the relative positions between the objects in the first, second, and third environment pictures and the user are in front of the user, on the left of the user, and on the right of the user, respectively.

First, it is detected whether the obtained relative positions meet a preset condition, the preset condition being: a first one of the relative positions is the object being in front of the user, a second one of the relative positions is the object being on the left of the user, and a third one of the relative positions is the object being on the right of the user.

Second, if it is detected that the preset condition is met, a straight line $B_2B_3$ is obtained, and the straight line $B_2B_3$ passes through a coordinate point $B_2$ corresponding to the object with the relative position on the left of the user and a coordinate point $B_3$ corresponding to the object with the relative position on the right of the user.

Third, a straight line $B_1S$ is obtained, and the straight line $B_1S$ passes through a coordinate point $B_1$ corresponding to the object with the relative position in front of the user and is perpendicular to the straight line $B_2B_3$.

Fourth, a coordinate of a perpendicular foot at the coordinate point S at the intersection of the lines $B_1S$ and $B_2B_3$ is determined as the actual coordinate of the user, and the direction from the perpendicular foot at the coordinate point S to the coordinate point $B_1$ is determined as the orientation.

Additionally, an angle δ between the orientation of the user and, e.g., the east direction in the absolute coordinate system may be further calculated as δ=arctan |(y0−y1)/(x0−x1)|.

In the above embodiment illustrated in the lower portion of FIG. 2I, the initial coordinate of the user is not necessarily used during calculating the actual coordinate and the orientation of the user. Thus, this calculation method is adapted to locate the geographic position of the user when the obtained initial coordinate is not accurate. Further, based on the method 200, a three-dimensional initial coordinate of the user may be used to obtain environment pictures with different altitude heights, so as to realize positioning and navigating in different floors indoor.

Still referring to FIG. 2A, in step 206, a destination coordinate of a destination to be reached by the user is obtained.

In exemplary embodiments, the electronic device obtains a destination coordinate of a destination to be reached by the user. For example, a name of the destination is inputted by the user, and the electronic device obtains the destination coordinate of the destination in the absolute coordinate system according to the name of the destination inputted by the user.

In step 207, at least one route is determined based on the destination coordinate and the geographic position information of the user.

In exemplary embodiments, the electronic device determines at least one route based on the destination coordinate and the geographic position information of the user. Since the geographic position information includes the actual coordinate of the user, after obtaining the destination coordinate and the actual coordinate of the user, the electronic device may determine at least one route from the actual coordinate of the user to the destination coordinate, that is, at least one route from the geographic position where the user is currently located to the destination to be reached by the user.

In step 208, the geographic position information, the destination coordinate, and the at least one route are displayed.

In exemplary embodiments, the electronic device displays the orientation of the user, the actual coordinate of the user, the destination coordinate, and the route, so as to guide the user to reach the destination according to the displayed information.

The method 200 overcomes the problem in the art that the weight, volume and production cost of an electronic device increase due to employing hardware components such as a gyro or an electronic compass to obtain an orientation of the user. Using the method 100, the geographic position information, including the orientation, of the user may be obtained without mounting additional hardware components such as a gyro or an electronic compass inside the electronic device, thereby reducing the weight and volume of the electronic device, and saving the production cost.

In exemplary embodiments, there are provided methods for determining the orientation and actual coordinate of the user. Some of the methods are less complex and have a high efficiency for positioning and navigating. Some of the methods determine the orientation and actual coordinate of the user by averaging two or more candidate orientations, so as to improve the stability of a calculation result. Some of the methods provide improved interaction with the user. In actual applications, different methods may be adopted according to different requirements.

Figure 3:
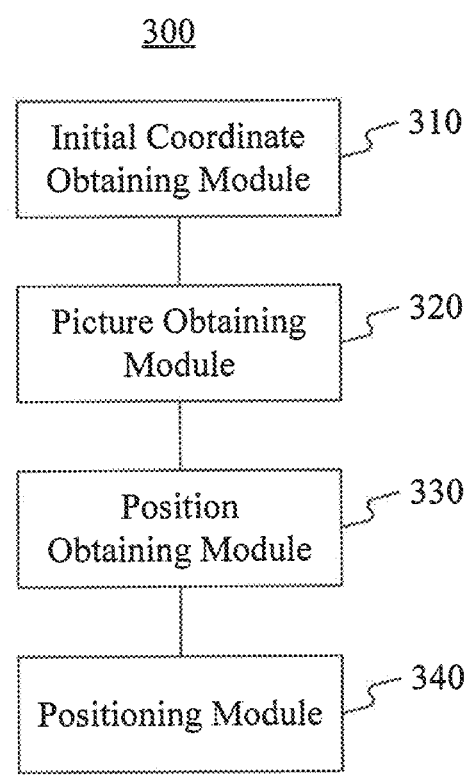
FIG. 3 is a block diagram of an apparatus for positioning and navigating, according to an exemplary embodiment.

FIG. 3 is a block diagram of an apparatus 300 for positioning and navigating, according to an exemplary embodiment. The apparatus 300 may be implemented as a part or all of an electronic device by software, hardware, or a combination thereof. The apparatus 300 operates using one or more of the above described methods. Referring to FIG. 3, the apparatus 300 includes an initial coordinate obtaining module 310, a picture obtaining module 320, a position obtaining module 330, and a positioning module 340.

The initial coordinate obtaining module 310 is configured to obtain an initial coordinate of a user.

The picture obtaining module 320 is configured to obtain a preset number of environment pictures in a preset geographic range corresponding to the initial coordinate, and obtain an absolute coordinate corresponding to each of the obtained environment pictures from a preset correspondence relationship between different environment pictures and different absolute coordinates.

The position obtaining module 330 is configured to obtain, for each of the obtained environment pictures, a relative position between an object in the environment picture and the user.

The positioning module 340 is configured to determine current geographic position information of the user based on the relative position and the absolute coordinate.

The apparatus 300 determines the geographic position information, including an orientation, of the user without mounting additional hardware components such as a gyro or an electronic compass inside the electronic device, thereby saving the weight and volume of the electronic device, and saving the production cost.

Figure 4:
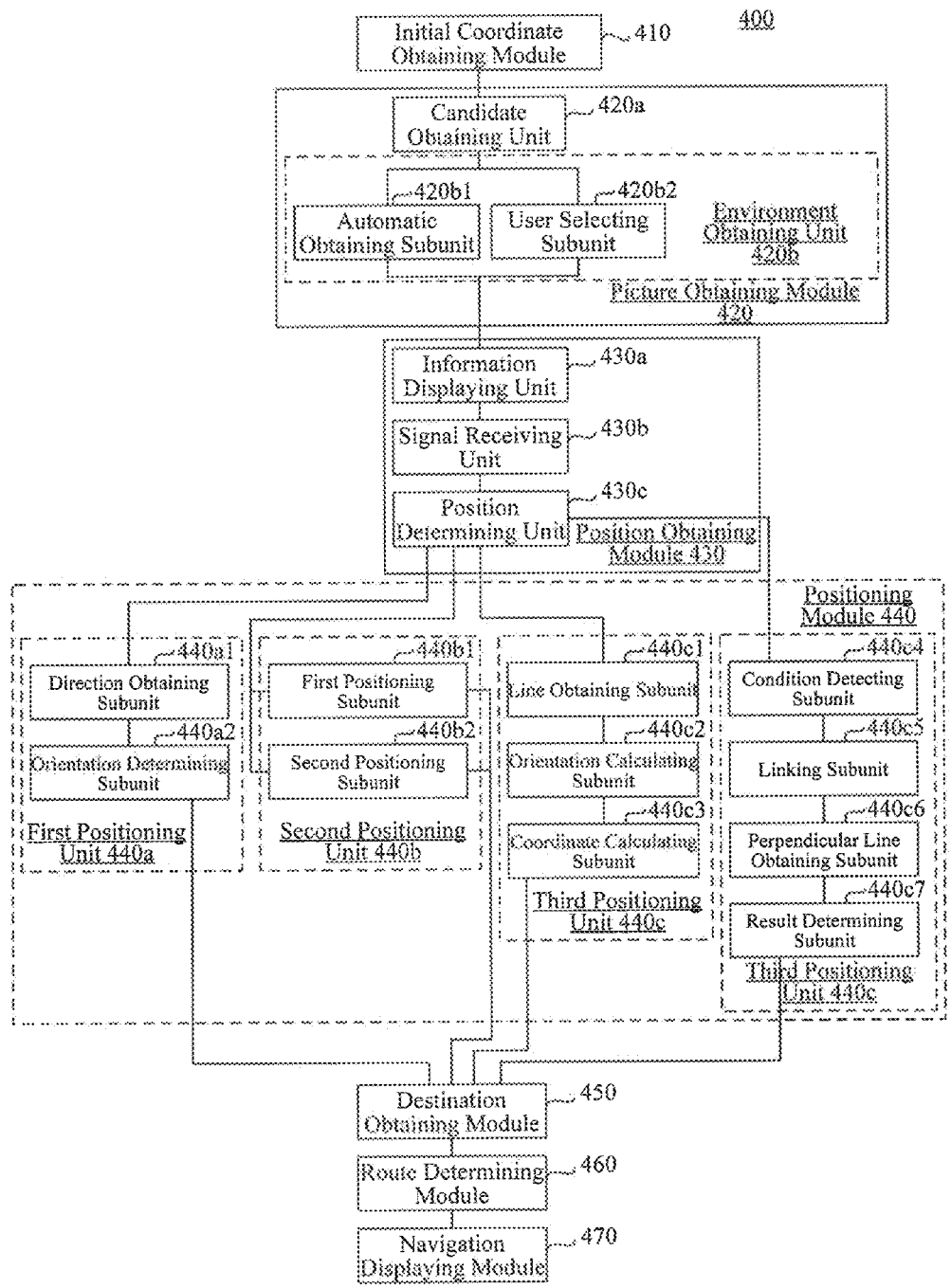
FIG. 4 is a block diagram of an apparatus for positioning and navigating, according to an exemplary embodiment.

FIG. 4 is a block diagram of an apparatus 400 for positioning and navigating, according to an exemplary embodiment. The apparatus 400 may be implemented as a part or all of an electronic device by software, hardware, or a combination thereof. The apparatus 400 operates using one or more of the above described methods. Referring to FIG. 4, the apparatus 400 includes an initial coordinate obtaining module 410, a picture obtaining module 420, a position obtaining module 430, a positioning module 440, a destination obtaining module 450, a route determining module 460, and a navigation displaying module 470.

The initial coordinate obtaining module 410 is configured to obtain an initial coordinate of a user.

The picture obtaining module 420 is configured to obtain a preset number of environment pictures in a preset geographic range corresponding to the initial coordinate, and obtain an absolute coordinate corresponding to each of the obtained environment pictures from a preset correspondence relationship between different environment pictures and different absolute coordinates.

In exemplary embodiments, the picture obtaining module 420 includes a candidate obtaining unit 420a and an environment obtaining unit 420b.

The candidate obtaining unit 420a is configured to obtain one or more candidate pictures, e.g., m candidate pictures, in the preset geographic range corresponding to the initial coordinate.

The environment obtaining unit 420b is configured to select one or more environment pictures, e.g., n environment pictures, from the m candidate pictures as the obtained environment pictures, where m≥n>0.

In exemplary embodiments, the environment obtaining unit 420b includes at least one of an automatic obtaining subunit 420b1 or a user selecting subunit 420b2.

The automatic obtaining subunit 420b1 is configured to order the m candidate pictures according to a preset priority so as to obtain a candidate picture sequence, and select the n environment pictures from the m candidate picture sequence.

The user selecting subunit 420b2 is configured to display a part or all of the m candidate pictures, receive a selection signal corresponding to n selected candidate pictures, and determine the n selected candidate pictures as the obtained environment pictures according to the selection signal.

The position obtaining module 430 is configured to obtain, for each of the obtained environment pictures, a relative position between an object in the environment picture and the user.

In exemplary embodiments, the position obtaining module 430 includes an information displaying unit 430a, a signal receiving unit 430b, and a position determining unit 430c.

The information displaying unit 430a is configured to display an environment picture of the obtained environment pictures and guide information, the guide information being provided to guide the user to face the object in the environment picture, and guide the user to move the environment picture in a corresponding direction, and/or to a corresponding position, according to the relative position between the object in the environment picture and the user.

The signal receiving unit 430b is configured to receive an input signal triggered by the user according to the guide information.

The position determining unit 430c is configured to determine the relative position between the object in the environment picture and the user according to the input signal.

The positioning module 440 is configured to determine current geographic position information of the user based on the relative position and the absolute coordinate corresponding to each of the obtained environment pictures.

In exemplary embodiments, the positioning module 440 includes at least one of a first positioning unit 440a, a second positioning unit 440b, or a third positioning unit 440c.

The first positioning unit 440a is configured to, when the preset number of environment pictures is one, determine the current orientation of the user based on the relative position obtained for the environment picture, the absolute coordinate corresponding to the environment picture, and the initial coordinate of the user, and determine the initial coordinate as an actual coordinate of the user.

In one exemplary embodiment, the first positioning unit 440a includes a direction obtaining subunit 440a1 and an orientation determining subunit 440a2.

The direction obtaining subunit 440a1 is configured to obtain a reference direction from a coordinate point A corresponding to the initial coordinate to a coordinate point B corresponding to the absolute coordinate of the environment picture.

The orientation determining subunit 440a2 is configured to determine the orientation of the user based on the reference direction and the relative position.

The second positioning unit 440b is configured to, when the preset number of environment pictures is two, determine the current orientation and the actual coordinate of the user based on the relative positions obtained for the two environment pictures, respectively, the absolute coordinates corresponding to the two environment pictures, respectively, and the initial coordinate of the user.

In one exemplary embodiment, the second positioning unit 440b includes at least one of a first positioning subunit 440b/1 or a second positioning subunit 440b2.

The first positioning subunit 440b/1 is configured to obtain a straight line $AB_1$ which passes through the coordinate point A corresponding to the initial coordinate and a coordinate point $B_1$ corresponding to the absolute coordinate of the first environment picture; determine the actual coordinate based on a coordinate point $B_2$ corresponding to the absolute coordinate of the second environment picture, the straight line $AB_1$, and the relative positions; and determine the orientation of the user based on the actual coordinate and at least one of the relative positions.

The second positioning subunit 440b2 is configured to obtain the straight line $AB_1$ which passes through the coordinate point A corresponding to the initial coordinate and the coordinate point $B_1$ corresponding to the absolute coordinate of the first environment picture and a straight line $AB_2$ which passes through the coordinate point A and the coordinate point $B_2$ corresponding to the absolute coordinate of the second environment picture; determine the orientation based on the straight line $AB_1$, the straight line $AB_2$, and the relative positions obtained for the two environment pictures, respectively; and determine the actual coordinate of the user based on the orientation and at least one of the relative positions.

The third positioning unit 440c is configured to, when the number of the environment pictures is three or more, determine the current orientation and the actual coordinate of the user based on the relative positions obtained for the three or more environment pictures, respectively, and the absolute coordinates corresponding to the three or more environment pictures, respectively.

In one exemplary embodiment, the third positioning unit 440c includes a line obtaining subunit 440c1, an orientation calculating subunit 440c2 and a coordinate calculating subunit 440c3.

The line obtaining subunit 440c1 is configured to obtain a straight line $AB_1$ which passes through the coordinate point A corresponding to the initial coordinate and a coordinate point $B_1$ corresponding to the absolute coordinate of the first environment picture, a straight line $AB_2$ which passes through the coordinate point A and a coordinate point $B_2$ corresponding to the absolute coordinate of the second environment picture, and a straight line $AB_3$ which passes through the coordinate point A and a coordinate point $B_3$ corresponding to the absolute coordinate of the third environment picture.

The orientation calculating subunit 440c2 is configured to determine the orientation of the user based on the straight line $AB_1$, the straight line $AB_2$, the straight line $AB_3$, and the relative positions obtained for the three or more environment pictures, respectively.

The coordinate calculating subunit 440c3 is configured to determine the actual coordinate of the user based on the orientation of the user and at least one of the relative positions.

In one exemplary embodiment, the third positioning unit 440c includes a condition detecting subunit 440c4, a linking subunit 440c5, a perpendicular line obtaining subunit 440c6, and a result determining subunit 440c7.

The condition detecting subunit 440c4 is configured to detect whether the relative positions obtained for the three or more environment pictures, respectively, meet a preset condition which is: a first one of the relative positions is that the object is in front of the user, a second one of the relative positions is that the object is on the left of the user, and a third one of the relative positions is that the object is on the right of the user.

The linking subunit 440c5 is configured to, if it is detected that the preset condition is met, obtain a straight line $B_2B_3$ which passes through a coordinate point $B_2$ corresponding to the absolute coordinate of the object with the relative position on the left of the user and a coordinate point $B_3$ corresponding to the absolute coordinate of the object with the relative position on the right of the user.

The perpendicular line obtaining subunit 440c6 is configured to obtain a perpendicular line $B_1S$ which passes through the coordinate point $B_1$ corresponding to the absolute coordinate of the object with the relative position in front of the user and perpendicular to the straight line $B_2B_3$.

The result determining subunit 440c7 is configured to determine a coordinate of a perpendicular foot at the coordinate point S as the actual coordinate of the user, and determine the direction from the perpendicular foot S to the coordinate point $B_1$ as the orientation of the user.

The destination obtaining module 450 is configured to obtain a destination coordinate of a destination to be reached by the user.

The route determining module 460 is configured to determine at least one route based on the destination coordinate and the geographic position information of the user.

The navigation displaying module 470 is configured to display the geographic position information, the destination coordinate, and the route.

The apparatus 400 obtains the geographic position information, including the orientation, of the user without mounting additional hardware components, such as a gyro or an electronic compass, inside the electronic device, thereby reducing the weight and volume of the electronic device, and saving the production cost.

Figure 5:
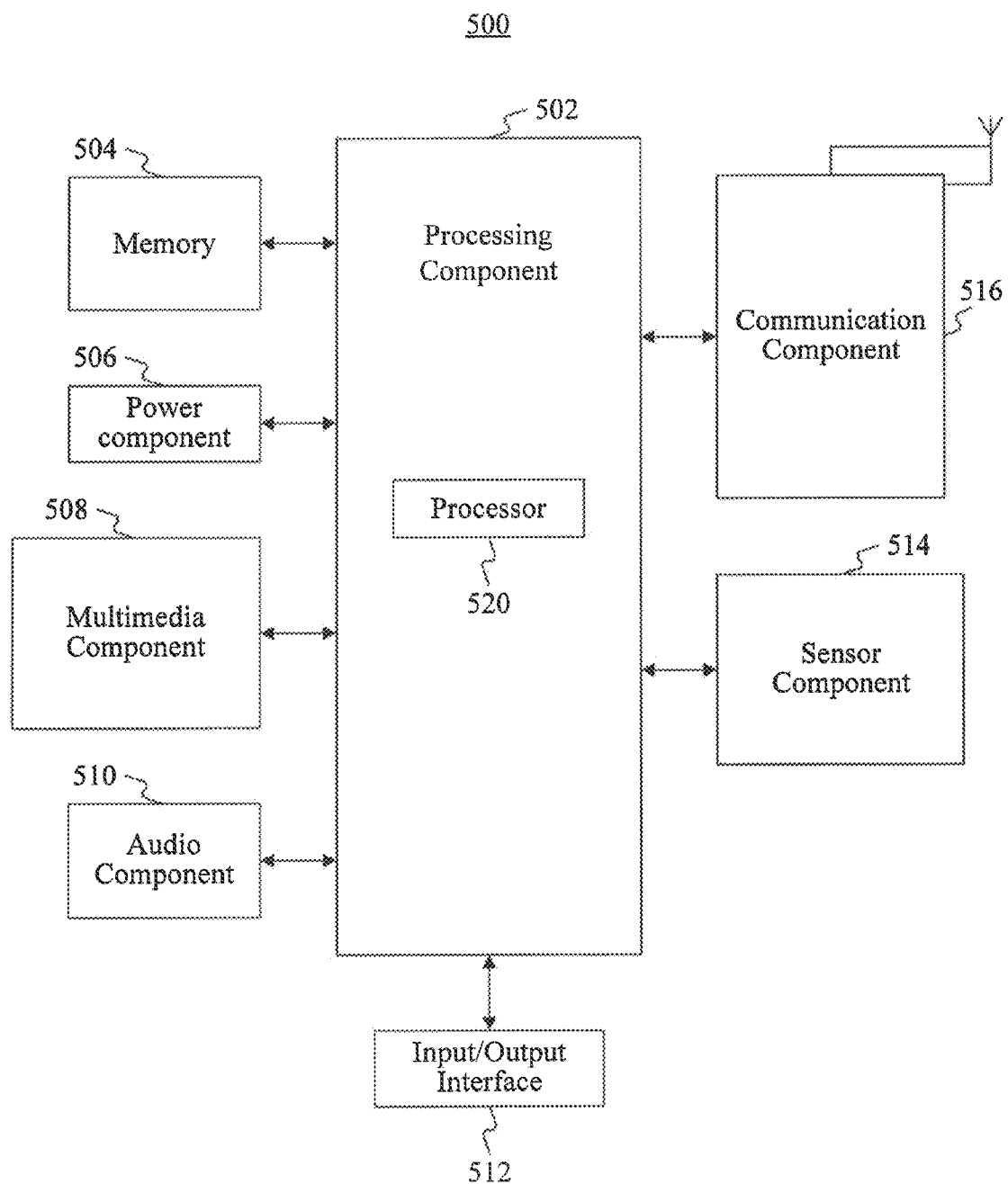
FIG. 5 is a block diagram of an electronic device for positioning and navigating, according to an exemplary embodiment.

FIG. 5 is a block diagram of an electronic device 500, according to an exemplary embodiment. For example, the electronic device 500 may be a mobile phone, a tablet computer, an E-book reader, an moving picture experts group audio layer III (MP3) player, an moving picture experts group audio layer IV (MP4) player, a laptop portable computer, a desktop computer, or the like.

Referring to FIG. 5, the electronic device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the electronic device 500, such as the operations associated with display, telephone calls, data communications, camera operations, and recording operations. The processing component 502 may include one or more processors 520 to execute instructions to perform all or part of the steps in the above-described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the electronic device 500. Examples of such data include instructions for any applications or methods operated on the electronic device 500, contact data, phonebook data, messages, pictures, video, and so on. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the electronic device 500. The power component 506 may include a power management system, one or more power supplies, one or more power management modes, and other components associated with the generation, management, and distribution of power in the electronic device 500.

The multimedia component 508 includes a screen providing an output interface between the electronic device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive external multimedia data while the electronic device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the electronic device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the electronic device 500. For instance, the sensor component 514 may detect an open/closed status of the apparatus, relative positioning of components, e.g., the display and the keypad, of the electronic device 500, a change in position of the electronic device 500 or a component of electronic device 500, a presence or absence of user contact with the electronic device 500, an orientation or an acceleration/deceleration of the electronic device 500, and a change in temperature of the electronic device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the electronic device 500 and other devices. The electronic device 500 can access a wireless network based on a communication standard, such as WiFi, 2G or 3G or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the electronic device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 520 in the electronic device 500, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and embodiments be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for positioning and navigating for use in an electronic device, the electronic device including a processor and a memory for storing instructions executable by the processor, the method comprising:
    obtaining, by the processor, an initial coordinate of a user;
    obtaining, by the processor, a preset number of one or more environment pictures in a preset geographic range corresponding to the initial coordinate, and obtaining, by the processor, an absolute coordinate corresponding to each of the obtained environment pictures from a preset correspondence relationship between different environment pictures and different absolute coordinates;
    obtaining, by the processor, for each of the obtained environment pictures, a relative position between an object in the environment picture and the user; and
    determining, by the processor, current geographic position information of the user based on the relative position and the absolute coordinate;
    wherein the obtaining of the preset number of environment pictures comprises:
        obtaining m candidate pictures in the preset geographic range corresponding to the initial coordinate; and
        selecting n environment pictures from the m candidate pictures as the obtained environment pictures, wherein m≥n>0;
    wherein when the preset number of environment pictures is one and a first environment picture is obtained, the determining comprises:
        determining a current orientation of the user based on the relative position obtained for the first environment picture, the absolute coordinate corresponding to the first environment picture, and the initial coordinate of the user; and
        determining the initial coordinate as an actual coordinate of the user;
    wherein when the preset number of environment pictures is two and first and second environment pictures are obtained, the determining comprises:
        determining the current orientation and the actual coordinate of the user based on the relative positions obtained for the first and second environment pictures, respectively, the absolute coordinates corresponding to the first and second environment pictures, respectively, and the initial coordinate of the user; and
    wherein when the preset number of environment pictures is three or more, and first, second, third, or more environment pictures are obtained, the determining comprises:
        determining the current orientation and the actual coordinate of the user based on the relative positions obtained for the first, second, third, or more environment pictures, respectively, and the absolute coordinates corresponding to the first, second, third, or more environment pictures, respectively.

2. The method according to claim 1, wherein the determining of the current orientation of the user based on the relative position, the absolute coordinate, and the initial coordinate when the preset number of environment pictures is one comprises:
    obtaining a reference direction from a first coordinate point corresponding to the initial coordinate of the user to a second coordinate point corresponding to the absolute coordinate of the first environment picture; and
    determining the current orientation of the user based on the reference direction and the relative position obtained for the first environment picture.

3. The method according to claim 1, wherein the determining of the current orientation and the actual coordinate of the user based on the relative positions, the absolute coordinates, and the initial coordinate of the user when the preset number of environment pictures is two comprises:
    obtaining a straight line which passes through a first coordinate point corresponding to the initial coordinate of the user and a second coordinate point corresponding to the absolute coordinate of the first environment picture;
    determining the actual coordinate of the user based on a third coordinate point corresponding to the absolute coordinate of the second environment picture, the straight line, and the relative positions obtained for the first and second environment pictures, respectively; and
    determining the current orientation of the user based on the actual coordinate of the user and at least one of the relative positions.

4. The method according to claim 1, wherein the determining of the current orientation and the actual coordinate of the user based on the relative positions, the absolute coordinates, and the initial coordinate of the user when the preset number of environment pictures is two comprises:
    obtaining a first straight line which passes through a first coordinate point corresponding to the initial coordinate of the user and a second coordinate point corresponding to the absolute coordinate of the first environment picture, and a second straight line which passes through the first coordinate point corresponding to the initial coordinate of the user and a third coordinate point corresponding to the absolute coordinate of the second environment picture;
    determining the current orientation of the user based on the first straight line, the second straight line, and the relative positions obtained for the first and second environment pictures, respectively; and
    determining the actual coordinate of the user based on the current orientation of the user and at least one of the relative positions.

5. The method according to claim 1, wherein the determining of the current orientation and the actual coordinate of the user based on the relative positions and the absolute coordinates when the preset number of environment pictures is three comprises:

obtaining a first straight line which passes through a first coordinate point corresponding to the initial coordinate of the user and a second coordinate point corresponding to the absolute coordinate of the first environment picture, a second straight line which passes through the first coordinate point corresponding to the initial coordinate of the user and a third coordinate point corresponding to the absolute coordinate of the second environment picture, and a third straight line which passes through the first coordinate point corresponding to the initial coordinate of the user and a fourth coordinate point corresponding to the absolute coordinate of the third environment picture, respectively;

determining the current orientation of the user based on the first straight line, the second straight line, the third straight line, and the relative positions obtained for the first, second, and third environment pictures, respectively; and determining the actual coordinate of the user based on the current orientation of the user and at least one of the relative positions.

6. The method according to claim 1, wherein the determining of the current orientation and the actual coordinate of the user based on the relative positions and the absolute coordinates when the preset number of environment pictures is three comprises:

detecting whether the relative positions obtained for the first, second, and third environment pictures meet a preset condition, the preset condition being: a first one of the relative positions is that the object in the first environment picture is in front of the user, a second of the relative positions is that the object in the second environment picture is on the left of the user, and a third one of the relative positions is that the object in the third environment picture is on the right of the user;

if it is detected that the preset condition is met, obtaining a first straight line which passes through a first coordinate point corresponding to the absolute coordinate of the object on the left of the user and a second coordinate point corresponding to the absolute coordinate of the object on the right of the user;

obtaining a second straight line perpendicular to the first straight line, the second straight line passing through a third coordinate point corresponding to the absolute coordinate of the object in front of the user and the first straight line; and determining a coordinate of a perpendicular foot of the second straight line as the actual coordinate of the user; and determining a direction from the perpendicular foot to the third coordinate point as the current orientation of the user.

7. The method according to claim 1, wherein the selecting comprises:

ordering the m candidate pictures according to a preset priority so as to obtain a candidate picture sequence; and selecting the n environment pictures from the candidate picture sequence.

8. The method according to claim 1, wherein the selecting comprises:

displaying a part or all of the m candidate pictures on the electronic device; and receiving a selection signal corresponding to n candidate pictures selected from the displayed candidate pictures.

9. The method according to claim 1, wherein the obtaining of the relative position comprises:

displaying a first environment picture of the obtained environment pictures and guide information, the guide information being provided to guide the user to face the object in the first environment picture, and guide the user to move the first environment picture at least one of in a corresponding direction or to a corresponding position, according to the relative position between the object in the first environment picture and the user;

receiving an input signal triggered by the user according to the guide information; and determining the relative position between the object in the first environment picture and the user according to the input signal.

10. The method according to claim 1, further comprising:

obtaining a destination coordinate of a destination to be reached by the user;

determining at least one route based on the destination coordinate and the current geographic position information of the user; and displaying the current geographic position information, the destination coordinate, and the at least one route on the electronic device.

11. An electronic device for positioning and navigating, comprising:

a processor; and a memory for storing instructions executable by the processor;

wherein the processor is configured to:

obtain an initial coordinate of a user;

obtain a preset number of one or more environment pictures in a preset geographic range corresponding to the initial coordinate, and obtain an absolute coordinate corresponding to each of the obtained environment pictures from a preset correspondence relationship between different environment pictures and different absolute coordinates;

obtain, for each of the obtained environment pictures, a relative position between an object in the environment picture and the user; and determine current geographic position information of the user based on the relative position and the absolute coordinate;

wherein, in obtaining the preset number of environment pictures, the processor is further configured to:

obtain m candidate pictures in the preset geographic range corresponding to the initial coordinate; and select n environment pictures from the m candidate pictures as the obtained environment pictures, wherein m≥n>0;

wherein when the preset number of environment pictures is one and a first environment picture is obtained, the processor is further configured to:

determine a current orientation of the user based on the relative position obtained for the first environment picture, the absolute coordinate corresponding to the first environment picture, and the initial coordinate of the user; and determine the initial coordinate as an actual coordinate of the user;

wherein when the preset number of environment pictures is two and first and second environment pictures are obtained, the processor is further configured to:

determine the current orientation and the actual coordinate of the user based on the relative positions obtained for the first and second environment pictures, respectively, the absolute coordinates corresponding to the first and second environment pictures, respectively, and the initial coordinate of the user; and wherein when the preset number of environment pictures is three or more, and first, second, third, or more environment pictures are obtained, the processor is further configured to:

determine the current orientation and the actual coordinate of the user based on the relative positions obtained for the first, second, third, or more environment pictures, respectively, and the absolute coordinates corresponding to the first, second, third, or more environment pictures, respectively.

12. The electronic device according to claim 11, wherein when the preset number of environment pictures is one, the processor is further configured to:

obtain a reference direction from a first coordinate point corresponding to the initial coordinate of the user to a second coordinate point corresponding to the absolute coordinate of the first environment picture; and determine the current orientation of the user based on the reference direction and the relative position obtained for the first environment picture.

13. The electronic device according to claim 11, wherein when the preset number of environment pictures is two, the processor is further configured to:

obtain a straight line which passes through a first coordinate point corresponding to the initial coordinate of the user and a second coordinate point corresponding to the absolute coordinate of the first environment picture;

determine the actual coordinate of the user based on a third coordinate point corresponding to the absolute coordinate of the second environment picture, the straight line, and the relative positions obtained for the first and second environment pictures, respectively; and determine the current orientation of the user based on the actual coordinate of the user and at least one of the relative positions.

14. The electronic device according to claim 11, wherein when the preset number of environment pictures is two, the processor is further configured to:

obtain a first straight line which passes through a first coordinate point corresponding to the initial coordinate of the user and a second coordinate point corresponding to the absolute coordinate of the first environment picture, and a second straight line which passes through the first coordinate point corresponding to the initial coordinate of the user and a third coordinate point corresponding to the absolute coordinate of the second environment picture;

determine the current orientation of the user based on the first straight line, the second straight line, and the relative positions obtained for the first and second environment pictures, respectively; and determine the actual coordinate of the user based on the current orientation of the user and at least one of the relative positions.

15. The electronic device according to claim 11, wherein when the preset number of environment pictures is three, the processor is further configured to:

obtain a first straight line which passes through a first coordinate point corresponding to the initial coordinate of the user and a second coordinate point corresponding to the absolute coordinate of the first environment picture, a second straight line which passes through the first coordinate point corresponding to the initial coordinate of the user and a third coordinate point corresponding to the absolute coordinate of the second environment picture, and a third straight line which passes through the first coordinate point corresponding to the initial coordinate of the user and a fourth coordinate point corresponding to the absolute coordinate of the third environment picture, respectively;

determine the current orientation of the user based on the first straight line, the second straight line, the third straight line, and the relative positions obtained for the first, second, and third environment pictures, respectively; and determine the actual coordinate of the user based on the current orientation of the user and at least one of the relative positions.

16. The electronic device according to claim 11, wherein when the preset number of environment pictures is three, the processor is further configured to:

detect whether the relative positions obtained for the first, second, and third environment pictures meet a preset condition, the preset condition being: a first one of the relative positions is that the object in the first environment picture is in front of the user, a second of the relative positions is that the object in the second environment picture is on the left of the user, and a third one of the relative positions is that the object in the third environment picture is on the right of the user;

if it is detected that the preset condition is met, obtain a first straight line which passes through a first coordinate point corresponding to the absolute coordinate of the object on the left of the user and a second coordinate point corresponding to the absolute coordinate of the object on the right of the user;

obtain a second straight line perpendicular to the first straight line, the second straight line passing through a third coordinate point corresponding to the absolute coordinate of the object in front of the user and the first straight line; and determine a coordinate of a perpendicular foot of the second straight line as the actual coordinate of the user; and determine a direction from the perpendicular foot to the third coordinate point as the current orientation of the user.

\* \* \* \* \*